UNITED STATES PATENT OFFICE.

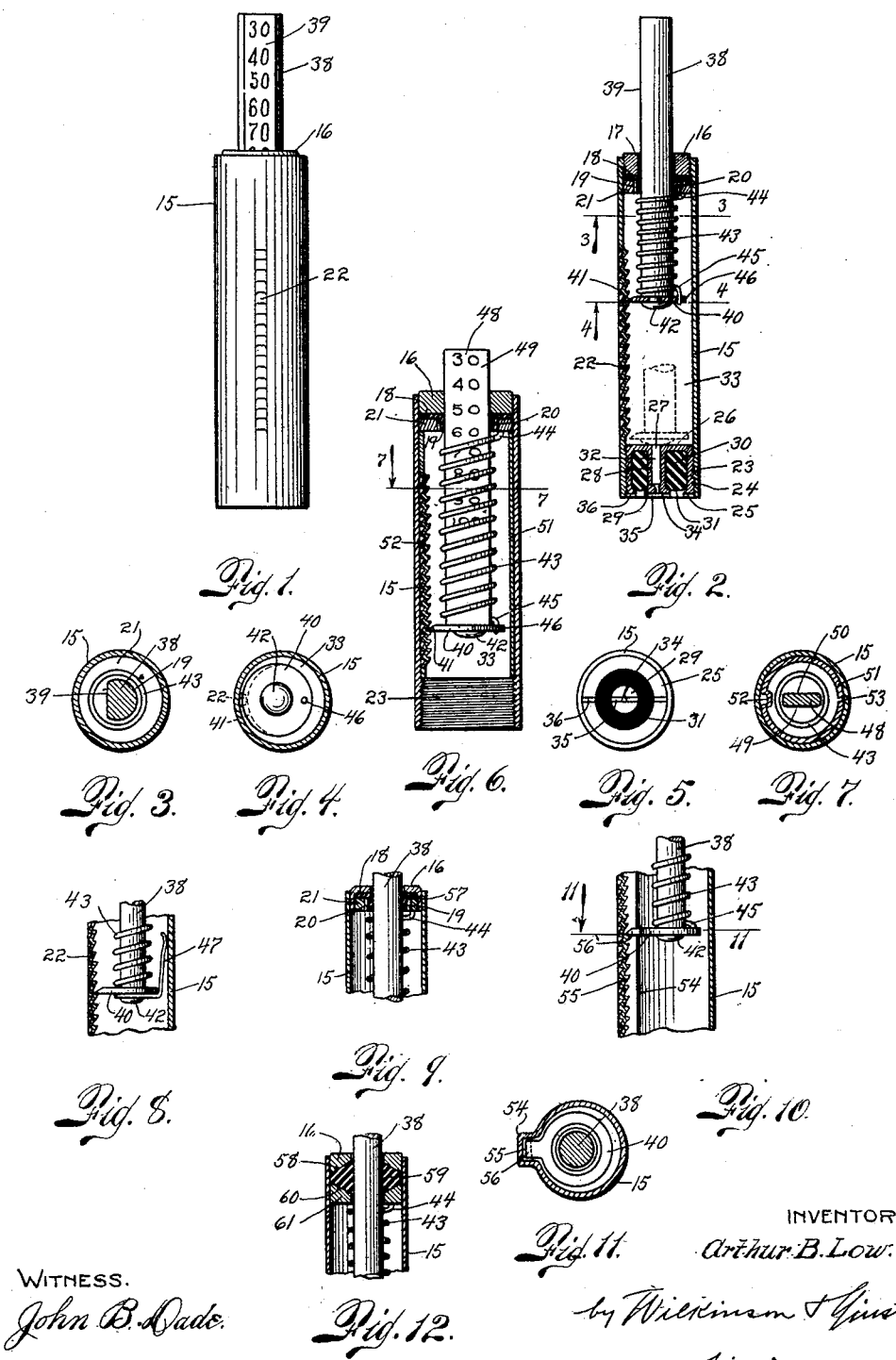

ARTHUR B. LOW, OF DENVER, COLORADO.

PRESSURE GAUGE.

1,403,429.  Specification of Letters Patent.  Patented Jan. 10, 1922.

Application filed June 17, 1921. Serial No. 478,358.

*To all whom it may concern:*

Be it known that I, ARTHUR B. LOW, a citizen of the United States, residing at the city and county of Denver and State of Colorado, have invented certain new and useful Improvements in Pressure Gauges; and I do hereby declare the following to be a full, clear, and exact description of the invention, such as will enable others skilled in the art to which it appertains to make and use the same.

This invention embodies improvements in pressure gauges and, while it more particularly relates to such gauges for indicating the pressure within an inflated pneumatic tire, it will be understood that the same may be efficiently employed in any relation where a pressure chamber provides a suitable nipple and stem controlled valve therefor.

In an earlier Patent No. 1,392,587 of Oct. 4, 1921, I have disclosed such an article, which is very short in length and elliptical in cross-section, covering certain important details as to construction and operation, and the present invention has likewise been devised with the aim of embodying other novel and advantageous features, more especially with relation to an assembly wherein an extremely light compression spring may be employed and whereby more positive means are provided to maintain the operating parts in registering position, when actuated and until manually released, although there are disclosed other material improvements as well of substantially equal importance, and all of which will hereinafter more fully appear.

The primary aim of the present invention, therefore, has been to devise a very small portable pressure gauge, of the type set forth, that will not only satisfactorily fulfill all of the requirements for which they are employed, but which also provides for minimum dimensions in length and cross-section, few co-operating parts little liable to get out of order or otherwise improperly function, a device which is self-contained and of finished ornate exterior, and which as a whole is so compact as to occupy inconsequential space when stored in a pocket or otherwise.

In addition to the aforementioned features, the compactness of the device, its simplicity of parts, assembly and operation, and the comparatively small cost of manufacturing and marketing the same, other objects and advantages of the invention will be so clearly apparent, as incidental to the following disclosure, that it would serve no useful purpose to further enlarge upon the same initially, and with these prefacing remarks, therefore, as well as for a clearer conception of the novel features more particularly set forth in the appended claims, reference will now be immediately had to the accompanying drawings, illustrating a practical embodiment of the improvements, in which drawings—

Figure 1 is an elevational view of the device with its gauge bar actuated to and held in registering position; Figure 2 is a longitudinal sectional view thereof taken at right angles to the position shown at Figure 1; Figures 3 and 4 are cross-sectional views taken on the lines 3—3 and 4—4, respectively, of Figure 2; Figure 5 is a bottom plan view; Figure 6 is a longitudinal sectional view through a modified arrangement, the air inlet plug being omitted, illustrating an inserted tube having a serrated rack-face and the gauge bar indicating numerals being shown on the flat faces thereof as disposed at right angles to the rack face, all of which features are obviously equivalent to the analogous features of the other views; Figure 7 is a cross-sectional view on the line 7—7 of Figure 6; and Figures 8, 9, 10, 11 and 12 are fragmentary sectional views of other slightly modified arrangements.

15 designates the casing, preferably formed of case hardened tubular steel, and, while it is shown as being cylindrical, it is obvious that it may be of any suitable shape in cross-section. Also, it may be noted at the outset that the gauge bar itself as hereinafter designated may be of any suitable form in cross-section, as well as being formed solid or hollow as desired.

The casing 15 is open-ended and provides for the proper fitting of an upper and a lower plug closure.

The upper plug closure 16 may simply comprise a comparatively thin disk, of approximately one-sixteenth of an inch in thickness, that may be sweated into the top of the casing, or it may be affixed thereto by screwthreaded elements as desired, and the same is apertured as at 17 for the passage therethrough of the gauge bar, the aperture being made conformable with the cross-section of the gauge bar.

18 indicates a flat washer body formed of a suitable flexible material, such as leather or its equivalent, which is adapted to be seated up against the inside face of the top plug 16. As shown at Figure 2, this flat washer body provides a downwardly disposed hollow extension or short nipple portion 19, encompassing the aperture of the flat body portion 18, and the said short nipple 19 is in turn freely encompassed by an annulus 21, preferably of aluminum or light metal, in such manner as to provide a diminutive air pressure channel 20 around the nipple 19, while at the same time firmly pressing the flat washer body 18 up against the underneath face of the plug 16.

The casing 15 is provided interiorly with a longitudinal serrated face which may be formed in any suitable way and which preferably extends downwardly to a position approximating the inner face of the bottom plug closure. In some of the views this serrated face is indicated at 22 and is shown as being formed by indenting the casing, while in Figures 6, 7, 10 and 11 it is provided for in modified ways, but in all cases the serrated face functions as a rack co-operating with positively actuated engaging means carried by the gauge bar.

The lower plug closure, or pressure air inlet control, may be threaded, sweated, crimped or otherwise affixed to the lower end of the casing 15, but in the drawings it is shown as being screwthreaded therein, and to this end the lower open end of the casing is internally threaded as at 23.

This pressure air inlet plug itself may be formed in various ways, but it preferably consists simply of a metallic stub shell having an externally threaded cylindrical wall 24, an open outer end with a slightly inturned circular flange 25, and a base wall 26 providing an air outlet aperture 27 that is encompassed by a tubular shank 28, extending concentrically through the hollow plug shell and terminating in a valve stem contacting head that may provide a slight external circular flange 29, the latter co-operating with the flange 25 for securely holding a suitable sealing gasket 30 embedded within the chamber of the hollow plug. However, either one or both of these flanges 25 and 29 could be omitted without seriously interfering with the maintenance of the sealing gasket 30 in place.

The gasket 30 is formed of rubber, or analogous substitute, centrally apertured to fit over the shank 28, and is of a thickness to snugly fill the hollow closure plug chamber between its base wall 26 and the tubular shank head 29, thus providing a slightly inset seating face 31, it being understood that the flanged head 29 serves as a contact means for engaging the projecting stem of an inflation valve, while the inset face 31 seats snugly down on the valve casing nipple as an air seal to prevent any leakage of pressure, excepting the escape into the gauge, when the inflation valve is opened by the head 29.

It is to be noted that the tubular shank 28 provides an axial bore 32 of slight diameter which communicates at its inner end with the operating chamber 33 of the gauge casing, by way of the outlet aperture 27 in the plug wall 26, and at its other end the axial bore 32 merges into a minutely restricted bore 34, in the flanged head 29, that in turn merges into a diagonal groove 35 provided at the outer face of the head 29. This diagonal groove serves both as a pressure air inlet recess to the bore 34 as well as a recess to take a screw driver head, the flange 25 being also provided with aligning recesses 36, if desired, to take the screw driver end as well, whereby the plug closure with its gasket may be screwed home as a bodily whole or unit, and without requiring any further capping element.

It may be said that if the axial bore through the plug closure was of the same diameter for its whole length, it would be very susceptible of becoming clogged up with dirt, and I guard against this by making the bore 32 of a trifle larger diameter than the minutely restricted bore 34, which latter is of about the diameter of a fine needle, so that should the bore 34 become slightly clogged, the dirt would most likely be blown clear by the air pressure or could readily be removed by the insertion of a straw or other fine article, as the bore 34 only extends a slight distance from the recess 35 before it merges into the larger bore 32.

38 designates the gauge bar or element which, as before stated, may be of any suitable shape in cross-section or of solid or hollow form as desired. In Figures 1 to 3 it is shown as having only one flat face 39 providing thereon a graduate scale in even multiples of the numeral ten, for indicating pressures which may be read by sighting the top of the casing or its plug as the index line. It is obvious, however, that the opposite face of the gauge bar, or for that matter any face thereof, may also be flattened to provide a further graduate scale of the same indicating numerals, or of an intermediately coordinated series such as forty-five, fifty-five, etc.

It is apparent that the gauge bar is projectingly operated freely through the top aperture 17 and the flexible washer element 18—19, although the latter is not intended to frictionally bind the gauge bar so as to hold the same elevated in its indicating position, but the said flexible washer element simply functions to seal the upper end of the casing against the escape of the pressure fluid as will later appear.

The lower end of the gauge bar carries a plate member 40, shown as a guide and pawl-like supporting disk although it may be otherwise than of disk formation if desired, but this disk member 40 is not a close fitting piston element and furthermore it co-operates with the rack face 22, as a positive retaining means for the gauge bar when actuated to registering position, it being preferably beveled at a position around its edge, as at 41, for proper sliding engagement with said rack face. The disk 40 may be affixed to the lower end face of the gauge bar by reducing the end of the latter, to pass through the aperture of the disk, and then peening over the end like a rivet head 42, or it may be affixed by a stud screw threaded into the lower end of the gauge bar.

As before stated, the disk 40 is not in itself a piston element at all, and provides substantial clearance space therearound, not only to permit of its beveled edge 41 to slidingly engage the rack face 22 but also allowing for the free passage of pressure air above as well as below the disk element, for a purpose that will more fully appear in the description of operations, and the functioning of which will permit of the employment of a very light compression spring, serving as the retractile means for the actuated gauge bar and otherwise functioning in a novel manner, all of which will now be described.

A coiled compression spring 43 is shown as encompassing the gauge bar, within the chamber 33, and it is to be particularly noted that its ends 44 and 45 terminate on the same side of the spring body, the lower end 45 being bent downwardly to enter a small aperture 46, of the supporting disk 40, while the upper end 44 seats up against the annulus 21. Thus the gauge bar is very slightly tilted, so that the disk 40 on its lower end is pressed lightly but positively to one side, with the beveled edge 41 thereof maintained in sliding engagement with the rack face 22, owing to the fact that the ends of the spring terminate on the same side of the spring body, with the upper terminal engaging the stationary annulus 21 while the lower terminal engages the movable disk 40, whereby, upon compression, the spring body tends to slightly bow in a direction opposed to the plane of the terminals thereof, and as the disk 40 is loose-fitting, with reference to its casing, it is naturally pressed to one side.

If the gauge bar's retractile spring terminals were not on the same side, or if the top and bottom of the spring seated flatly against their abutments, the pressure of the spring would be exerted in a true axial line and the lateral thrust of the lower end of the gauge bar would not then occur, so that if such a spring structure is desired it would then be necessary to supply an auxiliary lateral pressure to hold the beveled edge 41 in engagement with the rack face. With such an aim in view, but more by way of illustration than as an actually desired expedient, at Figure 8 I have shown a slightly modified arrangement, whereby the pressure of the retractile spring is in a truly direct axial line and the lateral thrust on the lower end of the gauge bar and disk 40 is caused by an auxiliary very light flat spring member 47, the mounting and functioning of which will be apparent.

In the modification of Figures 6 and 7, the primary alteration is that the rack face is not formed by indenting the casing 15, but there is inserted a separate tubular element 51 providing the indented rack face 52, the element being formed from a flat metal blank that is properly indented and then bent into final shape, with a narrow longitudinal gap 53 left between its opposing edges to allow for a springy gripping action. Also, by way of illustration only, the gauge bar 48 is shown as flattened on two sides, each face 49 and 50 of which may have proper indicating numerals thereon. Also, in Figure 6, the top plug 16 is shown as fitted in place otherwise than by screw-threaded attachment, but these latter features are obviously inconsequential details.

In Figures 10 and 11, the alterations are likewise of a minor character, and consist simply in pressing out the casing to provide a longitudinal recess 54 embodying the rack face 55 and with which is associated a beveled lip or tongue 56 formed on the supporting disk 40. In these views, the feature is shown in exaggerated dimensions, for clearness, and the arrangement primarily suggests itself with reference to the employment of a solid cylindrical or hollow tubular gauge bar to prevent the same from turning. Without the projecting recess wall 54, the same end would be attained by a tongue and groove connection as appears in my prior application aforesaid.

At Figure 9 there is shown a slightly different way of sealing the top of the gauge casing, in that the plug 16 is illustrated as a hollow cap that snugly receives the flexible washer element 18—19 and the retaining annulus 21 therefor, so that all of these parts may be fitted as an assembled whole or unit.

At Figure 12, a sealing washer of cork or analogous yielding material is illustrated, the washer 59 being shown as of double-convex conical formation, so that the plug 16 and annulus 61 would then have the conically concave seating surfaces 58 and 60 respectively. It is also obvious that such a washer may have only one surface conical and the other face flat, with correspondingly altered complementary surfaces of the plug and annulus.

From the foregoing replete description, it is believed that the operation of the device will be self-evident, although it may be said that when the device is placed over the nipple of an inflation valve casing, the contact head 29 engaging the projecting end of the stem of the valve will open the latter, while the face 31 of the gasket 30 seats down tightly on the top edge of the valve nipple, whereupon the air pressure in the pneumatic tire will escape only into the chamber 33 of the gauge casing by way of the conduit 35—34—28—27, and gauge bar is correspondingly elevated to indicate the pressure within the tire, being positively held in its registering position by the engagement of the beveled edge 41, of the supporting disk 40, with the rack face 22. To return the parts to their normal positions, it is simply necessary to flick the protruding end of the gauge bar laterally in the direction of the rack face, causing the supporting disk to be correspondingly moved in the opposite direction, or away from the rack face, whereupon the compression of the spring 43 is relieved and its tension will immediately move the gauge bar downwardly to its lowermost position.

Of course, it is understood that the coil spring must be proportionately tensioned, relatively to the indicator scale, to properly register the air pressure, and for that reason such gauges have heretofore employed substantially stiff springs and piston elements as retarding means to counterbalance the high pressure in the pneumatic tire being tested, and where a very light spring is to be employed, which it is one of my primary aims to do, provision must likewise be made to counterbalance such pressures.

I desire therefore to finally emphasize that, in my improved device, when the pressure air enters the gauge casing, it entirely fills the chamber 33 in more or less of an equalizing or stabilizing manner, with reference to the space above and below the disk 40, excepting that the area of the underneath face of the supporting disk is greater than its upper face to the extent of the cross-sectional area of the gauge bar itself, and in effect the actual working pressure face, to be counteractively regulated by the spring, is the cross-sectional area of the gauge bar only. Hence it would appear obvious that a very light tensioned coil spring only is requisite.

It may also be said that as the pressure air rushes into the gauge casing, it envelops the extension 19 of the leather washer by filling the encompassing channel 20, thus sealing the washer against the gauge bar to prevent leakage at the upper end of the casing. This washer is only intended for that purpose and not as a frictional gripping means to hold the gauge bar elevated, as disclosed in my former application aforesaid, this latter functioning being attained by the positive sliding engagement of the disk support with its co-operating rack face.

I am aware of the fact that other analogous forms of pressure gauges for pneumatic tires have previously been patented, but I make no broad claims to the generic idea as such, nor on the other hand do I wish to limit myself unnecessarily to the exact details of construction as herein disclosed, excepting as they may come within the terms of the ensuing claims or as interpreted fairly in the light of the specification if necessary.

What I do claim, as new and patentable, is:—

1. A pressure gauge embodying a casing forming an elongated chamber, a suitably apertured top closure therefor and a bottom closure providing a pressure fluid inlet, a valve stem contacting element and a surrounding seating face, a gauge bar operating through said apertured top closure, an encompassing fluid sealing washer therefor seated up against said top closure, a transversely disposed member carried by the lower end of said gauge bar and allowing for the free passage of pressure fluid above same, co-operating means for supporting said gauge bar in its elevated registering position, and compressible means interposed between said transverse member and said top closure.

2. A pressure gauge embodying an elongated casing having a longitudinally disposed internal rack face, a suitably apertured top closure therefor and a bottom closure providing a pressure fluid inlet, a valve stem contacting element and a surrounding seating face, a gauge bar operating through said apertured top closure, an encompassing fluid sealing washer therefor, a transversely disposed member carried by the lower end of said gauge bar and allowing for the free passage of pressure fluid above same, the said transverse member being in resilient sliding engagement with said rack face, and compressible means interposed between said transverse member and said top closure.

3. A pressure gauge embodying an elongated casing having a longitudinally disposed internal rack face, a suitably apertured top closure therefor and a bottom closure providing a pressure fluid inlet, a valve stem contacting element and a surrounding seating face, a gauge bar operating through said apertured top closure, an encompassing fluid sealing washer therefor, a transversely disposed member carried by the lower end of said gauge bar and allowing for the free passage of pressure fluid above same, the said transverse member being adapted for sliding engagement with said rack face, and a coil spring encircling said gauge bar between said transverse member and said top closure, the ends of said coil spring terminating on the same side of the spring body and with the lower terminal in engagement with said transverse member.

4. A pressure gauge embodying an elongated casing, a suitably apertured top closure therefor, and a bottom closure providing a pressure fluid inlet, a valve stem contacting element and a seating face, a gauge bar operating through said apertured top closure, an encompassing fluid sealing washer therefor, means for supporting said gauge bar, in its elevated registering position, comprising a transversely disposed member carried by the lower end of said gauge bar in resiliently mounted sliding engagement with an inner wall face of said casing, which said member loosely fits said casing to provide a clearance space between its edge face and said casing, and compressible means interposed between said transverse member and one end of said casing.

In testimony whereof, I affix my signature.

ARTHUR B. LOW.